ABSTRACT OF THE DISCLOSURE

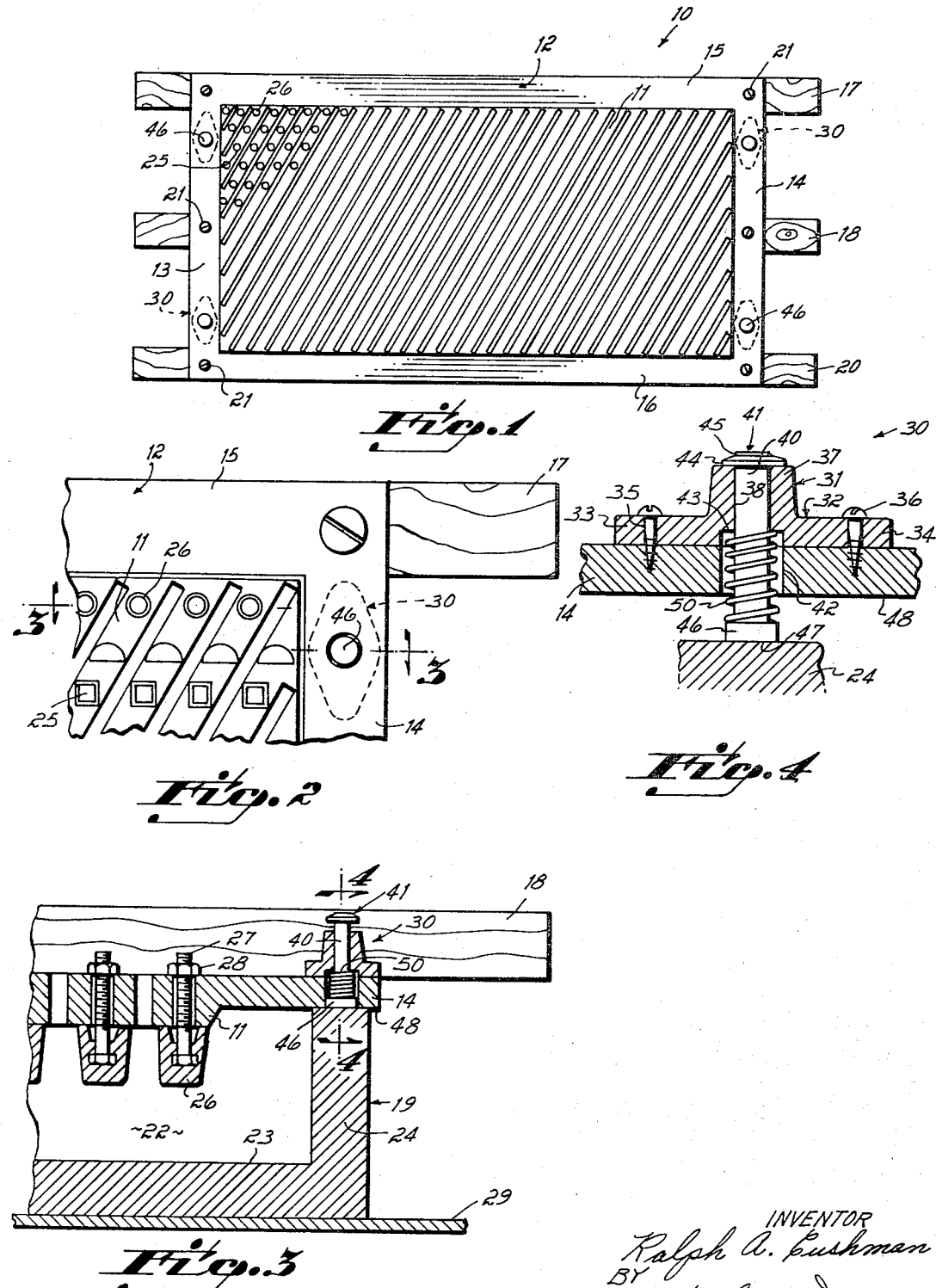
Feb. 27, 1968   R. A. CUSHMAN   3,370,554
MOLD BOARD CONSTRUCTION FOR CANDY MACHINES
Filed Dec. 6, 1965
INVENTOR
Ralph A. Cushman
BY Wood, Herron and Evans
ATTORNEYS

# 3,370,554
MOLD BOARD CONSTRUCTION FOR CANDY MACHINES Ralph A. Cushman, Cincinnati, Ohio, assignor to Cushman Foundry, Inc., Cincinnati, Ohio, a corporation of Ohio
Filed Dec. 6, 1965, Ser. No. 511,735
1 Claim. (Cl. 107—3)

A mold board for use with starch trays in molding candy centers. The mold board includes a rectangular frame which abuts the starch board and a plurality of spring plunger assemblies mounted on the rectangular frame, each spring assembly includes a housing, a plunger for engagement with the starch tray and a compressible coil spring.

---

This invention relates to candy making equipment and is more particularly directed to an improved mold board construction.

In commercial candy making plants one of the principal operations is the manufacture of center pieces, or cores, for various types of candies, such as bonbons and the like. These cores are subsequently chocolate covered, or enrobed, to form the finshed candy pieces. In conventional practice, the first step in producing cores is to fill a plurality of shallow trays with a fine particulate material, commonly starch. These so-called starch trays are conveyed by means of a chain conveyor, or the like, to a printing machine. In the printing machine the trays rest on a horizontal surface beneath a vertically reciprocating platen. This platen carries a mold board to which are secured a large number of individual mold elements having the desired configuration of the candy centers.

As the platen of the printing machine is lowered, the mold elements are forced into the starch and form a large number of cavities. After the cavities have been formed, the platen is elevated to withdraw the molds from contact with the starch. The starch mold is then conveyed beneath a depositer which deposits a quantity of confection in each of the cavities of the starch tray. After the deposited centers have hardened, the starch trays and centers are dumped and the centers are separated from the starch. Finally, the centers are enrobed with chocolate or coated with some other material to complete the candy making operation.

In candy making operations of the type described, it is very desirable that the center piece molds form a clean impression in the starch trays. This facilitates the production of regularly shaped cores and attractive, well conformed pieces of candy of uniform size and shape. However, in order to meet the large production requirements of modern candy plants, it is desirable to provide equipment for molding cavities in starch trays at a high rate of speed. In the past, appreciable difficulties have been encountered, as the speed of the printing machine has been increased, in obtaining accurate, well defined cavities in the starch trays.

The present invention is predicated upon the empirical discovery and determination that the source of this difficulty lies in the tendency of the starch trays to be lifted by the mold board during the retraction of the mold board; and in the concept of a simple, improved mold board structure for obviating this difficulty.

More particularly, the present invention is directed to an improved mold board carrying a plurality of spring urged plungers. These plungers are disposed for engagement with the side walls of the starch trays. As the mold board is advanced into engagement with the trays, the spring plungers are depressed and retract into openings provided in the mold board. Thus, the plungers do not in any way impede the full and complete penetration of the molds into the starch. However, when the mold board and molds are withdrawn, the spring plungers are projected downwardly from the mold board. These plungers are effective to hold the tray against the stationary support surface and prevent its being lifted and then dropped upon retraction of the printing platen and mold board.

One of the principal advantages of the present improved mold board construction is that it facilitates the formation of more accurately and uniformly shaped center cavities in the starch trays. At the same time, by use of the present improved mold board construction, the speed of operation of the printing machine can be increased without causing the production of defective mold cavities.

Another advantage of the present improved mold board construction is that it is extremely simple and economical. Moreover, the improved spring plunger mechanism can readily be used with existing mold boards as well as incorporated in newly constructed mold boards.

These and other objects and advantages of the present invention will be more readily apparent from a consideration of the following detailed description of a preferred embodiment of the invention.

In the drawings:

FIGURE 1 is a bottom view of an improved mold board provided with spring plunger assemblies of the present invention.

FIGURE 2 is an enlarged partial view of a corner of the mold board shown in FIGURE 1.

FIGURE 3 is a cross sectional view taken along line 3—3 of FIGURE 2 showing the mold board inverted in its normal operating position relative to a conventional starch tray.

FIGURE 4 is a cross sectional view taken along line 4—4 of FIGURE 3.

One preferred form of mold board 10 constructed in accordance with the principles of the present invention is shown in its entirety in FIGURE 1. The basic mold board shown is a one-piece aluminum casting of the type disclosed in detail in Cushman United States Patent No. 3,033,131. It is to be understood, however, that the present invention is not limited to use with this specific type of mold board. Rather, the improved spring plunger assemblies of the present invention can also be used advantageously with conventional mold boards of the type comprising a rectangular frame and a plurality of individual wooden or metal strips in place of the integral strips 11 shown in FIGURE 1.

As is shown in FIGURE 1, the mold board 10 is constituted by a unitary aluminum casting having a generally rectangular frame portion 12. This frame portion includes two transverse side sections 13 and 14 and two longitudinal sections 15 and 16. Frame 10 is secured to a plurality of elongated cross bars 17, 18 and 20 as by means of screws 21 which pass through suitable openings in the frame and threadably engage the cross bars.

Cross bars 17, 18 and 20 are in turn mounted upon a vertically reciprocating platen of a printing machine (not shown) which is effective to raise and lower the mold board relative to a starch tray, such as starch tray 19 shown in FIGURE 3. In a conventional candy making operation starch trays, such as starch tray 19, are carried by a chain conveyor (not shown), or the like, which carries them to the molding or printing machine where the trays rest on a flat surface 29 provided by rails, a table or the like. Each of the starch trays 19 includes an upwardly opening cavity 22 formed by a bottom wall 23 and side walls 24. This cavity is filled with a fine particulate material, such as starch.

Mold board 10 carries a plurality of individual mold elements, such as elements 25 and 26, mounted upon strips 11. These mold elements, which correspond to the desired shape and size of the candy centers, are mounted upon strips 11 as by means of bolts 27 and nuts 28. When the printing platen lowers the mold board toward the starch tray, molds 25 and 26 are pressed into the starch to form cavities of the desired size and shape.

The novel feature of the present invention is the provision of a plurality of spring plunger assemblies 30 carried by the mold board. In the preferred embodiment, four assemblies 30 are provided, two such assemblies being disposed over each of the opposite tray side walls. As is best shown in FIGURES 2, 3 and 4, each of the plunger assemblies comprises a housing 31. Housing 31 is preferably cast of any suitable metal, such as aluminum. The housing includes a bottom flange portion 32 having two elongated extensions 33 and 34. These extensions are provided with suitable openings 35 which receive screws 36. Screws 36 are in turn threaded into arms 13 and 14 of the mold boards to secure the housings to the upper surface of the mold board.

Each housing 31 also includes a cap, or boss-like section, 37 which extends upwardly from the flange portion. The boss 37 includes a cylindrical bore 38 for receiving the stem 40 of plunger 41. A second cylindrical bore 42, of larger diameter than bore 38, is formed concentric with bore 38 through arm 14 of the mold board and a portion of flange 32. Bores 38 and 43 meet in an annular shoulder 43.

Plunger 41 carries a retaining washer 44 at its upper end. This washer is preferably fit over a turned down section on the upper end of the plunger and this section is then upset to form a head 45 locking the washer in place. Washer 44 is of a larger diameter than bore 38 and hence prevents downward escape of the plunger. The lower end of the plunger 41 is provided with an enlarged foot portion 46. This foot portion is preferably cylindrical and of a slightly smaller diameter than bore 42. Thus, the foot portion can be retracted within the arm 14 of the frame to a position in which the lower surface 47 of the foot is flush with the lower surface 48 of the frame when the frame is in engagement with the starch tray as shown in FIGURE 3. The plunger is normally spring urged downwardly to an extended position in which the foot extends a substantial distance below the lower surface 48 of the frame as shown in FIGURE 4. More particularly, this is accomplished by means of a spring 50 compressed between foot 46 and annular shoulder 43.

In operation, a starch tray, such as starch tray 19, is shifted by a chain conveyor across support surface 29 beneath the reciprocating platen (not shown) of the printing machine. As the platen lowers the mold board 10, mold elements 25 and 26 enter the starch mounted within the tray cavity 22. The mold board is lowered until the lower surface 48 of the frame member comes into contact with the upper ends of the side walls 24 of the mold board. In this position, the top wall of the frame forces plunger 41 upwardly so that the foot 46 is completely recessed within the side wall of the frame.

As the plunger of the printing machine rises, the springs 50 force plungers 41 downwardly so that feet 46 are effective to hold the starch tray against the support surface 29. As a result, clean impressions are made by the candy molds and the operation of the printing machine can be speeded up without causing the tray to be lifted from the support surface.

Having described my invention, I claim:

1. An improved starch tray and candy mold board construction of the type wherein the mold board construction is adapted to be mounted on a reciprocating platen for movement toward and away from the starch tray, said mold board construction comprising a generally rectangular frame member, a plurality of parallel strips carried by said frame member, said strips being adapted to support a plurality of mold members, and a plurality of spring plunger assemblies carried by said frame member, each of said spring plunger assemblies comprising a housing, means mounting said housing upon the upper surface of said frame, a bore in said housing, said frame having an opening formed therein in registry with said bore, the opening in said frame being of larger diameter than the diameter of the bore in said housing, a retractable plunger extending through the bore in said housing and the opening in said frame member, said plunger having a foot normally extending below said frame member, and a coil spring surrounding said plunger and being interposed between said foot and said housing, said coil spring urging said plunger to a downwardly extending position with said foot disposed for engagement with said starch tray, said plunger being retractable upon movement of said mold board toward said tray and said foot into contact with said tray so that said foot is entirely disposed within said opening in said frame, whereby said frame can be forced into abutment with said starch tray.

References Cited

UNITED STATES PATENTS

| | | | |
|---|---|---|---|
| 198,096 | 12/1877 | Folwell | 249—133 |
| 2,230,778 | 2/1941 | Flores | 107—68 XR |
| 1,652,332 | 12/1927 | Thomsen et al. | 164—187 |
| 2,260,667 | 10/1941 | Hoof | 18—19 |
| 2,624,296 | 1/1953 | Nuttall | 18—22 X |
| 3,033,131 | 5/1962 | Cushman | 107—3 |

WALTER A. SCHEEL, *Primary Examiner.*

J. M. NEARY, *Assistant Examiner.*